United States Patent [19]

Cowgill

[11] Patent Number: 5,768,361

[45] Date of Patent: Jun. 16, 1998

[54] FLEXIBLE ENHANCED SIGNALING SUBSYSTEM FOR A TELECOMMUNICATIONS SWITCH

[75] Inventor: George A. Cowgill, Parker, Tex.

[73] Assignee: MCI Corporation, Washington, D.C.

[21] Appl. No.: 580,948

[22] Filed: Dec. 29, 1995

[51] Int. Cl.[6] .................................................. H04M 3/00
[52] U.S. Cl. ........................... 379/229; 379/230; 370/385; 370/422; 370/522; 370/524
[58] Field of Search ........................... 370/384, 385, 370/422, 426, 522, 524; 379/201, 207, 219, 229, 230, 243, 244

[56] References Cited

U.S. PATENT DOCUMENTS

| | | | |
|---|---|---|---|
| 3,564,149 | 2/1971 | Funk et al. | 379/222 |
| 5,048,081 | 9/1991 | Gavaras et al. | 379/230 |
| 5,239,542 | 8/1993 | Breidenstein et al. | 370/384 |
| 5,367,566 | 11/1994 | Moe et al. | 379/230 |
| 5,546,398 | 8/1996 | Tucker et al. | 379/230 |
| 5,550,914 | 8/1996 | Clarke et al. | 370/384 |

*Primary Examiner*—Krista Zele
*Assistant Examiner*—Daniel S. Hunter

[57] ABSTRACT

The Flexible Enhanced Signaling Subsystem (FESS) performs table-driven processing of incoming and outgoing messages and also handles multiple message types and trunk groups. A message received by the FESS is first processed by an incoming signaling module which performs all necessary transformations to the message to enable the existing switch processing to handle any incoming message. The incoming signaling module, being table-driven, can be easily modified to handle any new message types which may be created. The message is then processed by an intermediate signaling module which includes the existing call processing. The intermediate signaling module may pass through messages, or it may generate new messages. In either case, an outgoing signaling module performs all necessary transformations to messages output from the intermediate signaling module to enable the outgoing trunk, downline switch or downline network to handle the message properly.

23 Claims, 12 Drawing Sheets

FLEXIBLE ENHANCED SIGNALING SUBSYSTEM FOR A TELECOMMUNICATIONS SWITCH

BACKGROUND OF THE INVENTION

1. Field Of The Invention

The invention relates generally to telecommunications switches, and more particularly to telecommunications switch using table-driven processing of signaling messages

2. Background Information

Signaling System 7 (SS7) is an out-of-band telephone signaling system which, in addition to providing supervisory, alert and addressing functions, provides flow control, connectionless services and Integrated Services Digital Network (ISDN) capabilities. The SS7 protocol consists of four basic sub-protocols:

1) Message Transfer Part (MTP), which provides functions for basic routing of signaling messages between signaling points.

2) Signaling Connection Control Part (SCCP), which provides additional routing and management functions for transfer of messages other than call setup between signaling points.

3) Integrated Services Digital Network User Part (ISUP), which provides for transfer of call setup signaling information between signaling points.

4) Transaction Capabilities Application Part (TCAP), which provides for transfer of non-circuit related information between signaling points.

The ISUP comprises a number of messages which perform various functions. Among these is the Initial Address Message (IAM) which is a mandatory message sent in the forward direction to initiate seizure of an outgoing circuit and to transmit address and other information relating to the routing and handling of a call. The IAM format includes a number of optional parameters which are supported in different combinations by different telephone service provider networks.

Prior art SS7 network 100 is shown in FIG. 1. Two switches 106 and 108 are shown as an example, but represent a large number of switches in an actual network. Switches 106 and 108 are connected to each other by trunk 118. Switch 106 is connected to another network 102 by trunk 120 and switch 108 is connected to another network 104 by trunk 122.

Trunks 120 and 122 represent two trunk types which are supported:

1) Feature Group D (FGD) is the type of trunk associated with equal access arrangements. All long distance telephone carriers enjoy identical connections to the local exchange carrier. All customers dial the same number of digits and can reach the predetermined long distance carrier of their choice by dialing 1 plus the telephone number being called.

2) Dedicated Access Line (DAL) is a private trunk line from a long distance carrier to a private switch.

Trunk 118 supports one trunk type known as Intermachine Trunk (IMT) which is a circuit which connects two switches owned by the same telephone carrier.

ISUP message formats allow a number of optional parameters which may be included in a message. Often a telephone carrier must filter messages to suppress parameters it does not wish to deliver to other networks. Switches 106 and 108 only support message filtering on the outgoing leg, the leg where a message is sent to another network. For example, message 112 is an IAM message which has been sent from network 102 to switch 106. Message 112 includes six optional parameters, designated in the figure as 'ABCDEF'. Switch 106 receives message 112 and transmits it over trunk 118 as message 112'. Switch 108 receives message 112'. Because switch 108 is to transmit message 112' to network 104, message 112' is filtered by service attribute table (SAT) 110. In this example, SAT 110 suppresses optional parameters 'DEF' from message 112'. Switch 108 then sends the message as message 113 containing only optional parameters 'ABC'.

One problem arises in the current art because the SATs only support IAMs. There is no SAT filtering capability for other SS7 messages. Thus, a telephone carrier has no capability to suppress delivery of parameters of other types of messages. A need exists for the capability to filter a variety of message types.

Another problem arises because SAT filtering occurs only on outgoing messages. There is no capability to filter messages which enter the telephone carrier network. The entry of some parameters into the network can have unintended impacts on the billing record. A need exists for the capability to filter incoming messages to a network.

Another problem arises because ISUP trunking maintains a direct correlation between ISUP trunk type and the signaling profile supported. For example, if switch 106 has been provisioned with trunk 120 selected as a DAL, switch 106 only supports DAL optional parameters over trunk 120. This correlation between trunk type and signaling capabilities causes internetworking problems. A need exists for the capability to support a variety of trunk types.

Another problem arises as new optional parameters are created and deployed throughout various telephone networks. The SATs of switches must be enhanced to include the new parameters. However, current art SATs are not modifiable by the telephone carrier. If new parameters are received and transported over the telephone network, the telephone carrier does not have the capability to suppress the delivery of these parameters to other networks. A need exists for easily modifiable service attribute tables.

Current art SAT filtering does not provide any mapping, default creation, enveloping or de-enveloping capabilities for messages entering or exiting the telephone carrier network. A need exists for filtering providing mapping, default creation, enveloping and de-enveloping of messages.

SUMMARY OF THE INVENTION

The present invention discloses a Flexible Enhanced Signaling Subsystem (FESS), which provides improved SS7 performance by meeting these needs. The FESS provides the capability to: 1) filter a variety of message types, 2) filter incoming as well as outgoing messages, 3) support a variety of trunk types, 4) easily modify the service attribute tables, and 5) perform mapping, default creation, enveloping and de-enveloping of messages.

The FESS performs table-driven processing of incoming and outgoing messages and also handles multiple message types and trunk groups. A message received by the FESS is first processed by an incoming signaling module which performs all necessary transformations to the message to enable the existing switch processing to handle any incoming message. The incoming signaling module, being table-driven, can be easily modified to handle any new message types which may be created. The message is then processed by an intermediate signaling module which includes the existing call processing. The intermediate signaling module may pass through messages, or it may generate new messages. In either case, an outgoing signaling module performs all necessary transformations to messages output from the intermediate signaling module to enable the outgoing trunk, downline switch or downline network to handle the message properly.

The processing performed by the incoming and outgoing signaling modules is similar, as are the tables which control them. When a message is received by a signaling module, the trunk group database is used to select the message control table which will be used. The message type is used to access the selected message control table to select the service attribute table. The service attribute table is used to control the detailed processing of the individual parameters contained by the message. Thus, the FESS provides processing based on trunk group, message type and formats and values of message parameters. This allows the SS7 signaling capabilities of the FESS to be separate from the trunk type selected for interconnection.

The FESS includes a set of message control tables for the incoming signaling module and another set for the outgoing signaling module. An Incoming Message (IMES) Control Table may be activated on any incoming SS7 message. An IMES table provides the capability to block entire messages or point a message to an Incoming Service Attribute Table (ISAT) for parameter filtering or manipulation. IMES screening occurs before the message is sent to a SAT or call processing function. An Outgoing Message (OMES) Control Table may be activated on any outgoing SS7 message. OMES table processing occurs after call processing but prior to OSAT parameter screening. An OMES table may provide a pointer to an OSAT for parameter screening The FESS also includes a set of enhanced service attribute tables (SAT) for each IMES and OMES. This Incoming Service Attribute Table (ISAT) functions as a filter of incoming SS7 messages and is activated prior to offering the message for call processing. The Outgoing Service Attribute Table (OSAT). functions as a filter of outgoing SS7 messages and is activated after call processing and prior to delivery of a message to an interconnecting node. The ISAT and OSAT have been enhanced over existing tables to provide processing based on individual parameters and to provide the capability to perform mapping, default creation, enveloping and de-enveloping for messages entering and exiting the telephone carrier network.

Although the disclosed embodiment utilizes the SS7 signaling system, the present invention is equally applicable to other signaling systems such as CCS7 or X.25.

BRIEF DESCRIPTION OF THE DRAWINGS

FIG. 2b is an exemplary block diagram of a flexible enhanced signaling subsystem (FESS) 200, shown in FIG. 2a.

FIG. 3c is a flow diagram of the processing performed by incoming signaling module 310 of FIG. 3a.

FIG. 3d is a flow diagram of the processing performed by outgoing signaling module 330 of FIG. 3a.

FIG. 5 is an exemplary data diagram of message processing performed incoming signaling module 310 of FIG. 3a.

DETAILED DESCRIPTION OF THE INVENTION

Figure 1:
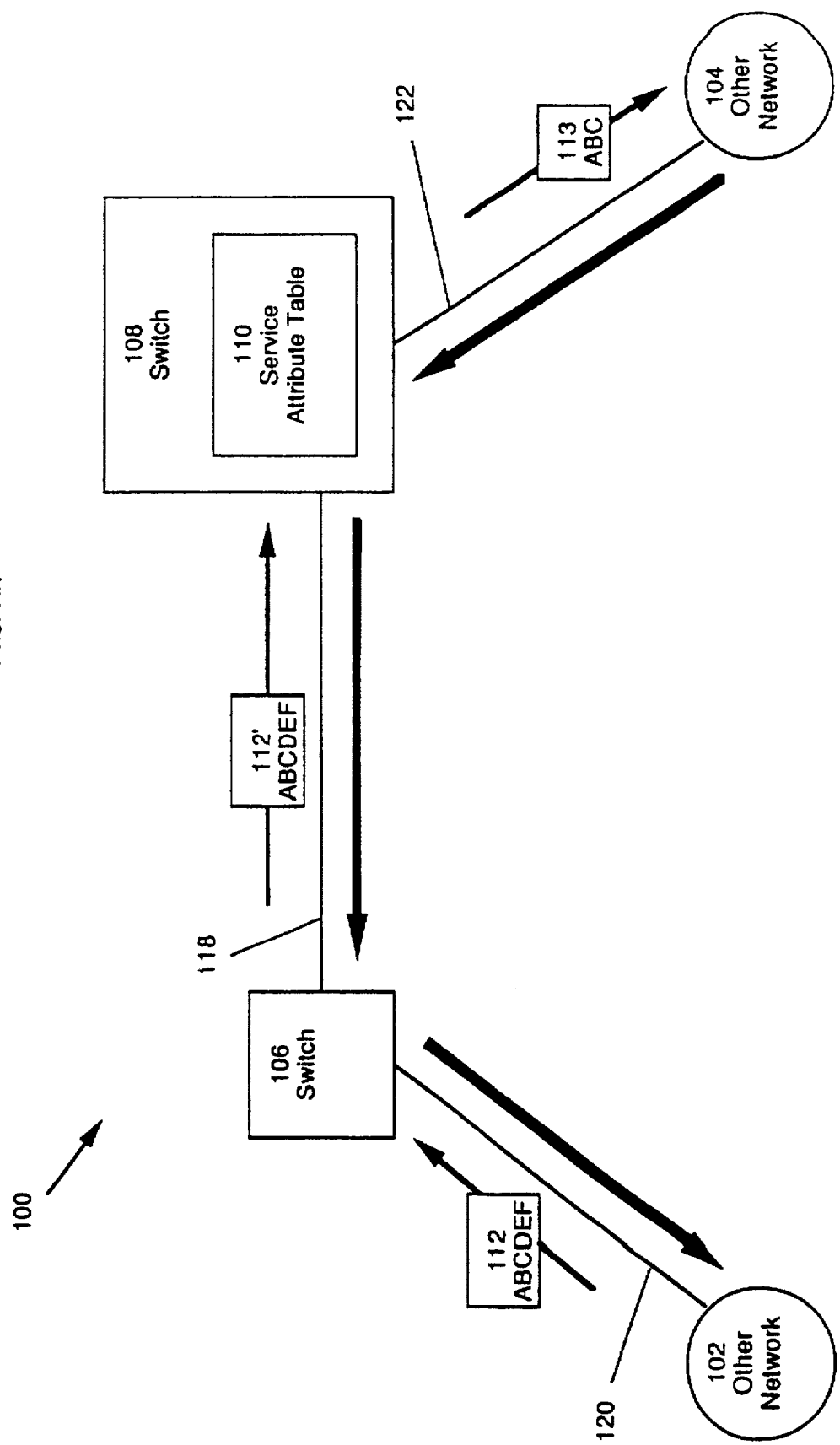
FIG. 1 is a block diagram of a prior art SS7 network 100.
Figure 2A:
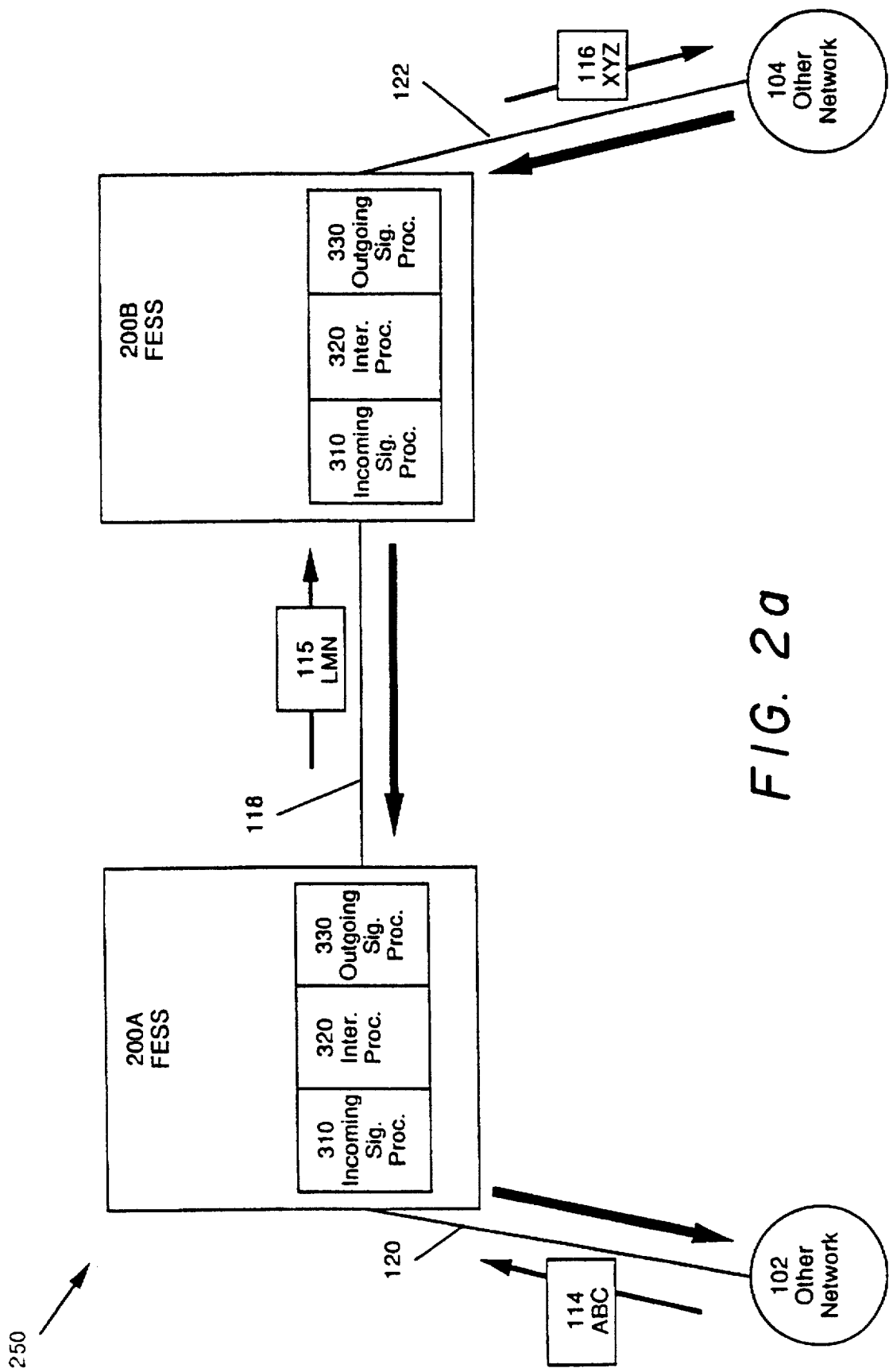
FIG. 2a is an exemplary block diagram of a network 250, in accordance with the present invention.

FIG. 2a is an exemplary block diagram of a network 250, in accordance with the present invention. Shown are two FESSs 200A and 200B. A FESS of the present invention, such as 200A and 200B, supports message processing both when a message is received by a switch and before a message is sent from a switch. In addition, a FESS has the capability of supporting any parameters of any message of any trunk group. The processing which provides this capability is controlled by a number of tables stored in each FESS. These tables are easily modified to add new capabilities or modify existing processing. Incoming signaling modules 310 of FESSs 200A and 200B each contain the tables and program instructions which perform message processing on messages received by the FESS. Block 320 of FESSs 200A and 200B contain program instructions which perform standard call processing, billing or inter system communications. Block 330 of FESSs 200A and 200B contain the tables and program instructions which perform message processing on messages which are to be sent by the FESS.

For example, message 114 is a message of any type which has been sent from network 102 to FESS 200A. Message 114 includes a number of optional parameters represented by 'ABC'. FESS 200A receives message 114 and processes it with incoming signaling module 310, then with intermediate signaling module 320 and finally with outgoing signaling module 330. Intermediate signaling module 320 includes the existing switch processing. Incoming signaling module 310 performs all necessary transformations to incoming messages to enable the existing switch processing to handle any incoming message. Incoming signaling module 310, being table-driven, can be easily modified to handle any new message types which may be created.

Intermediate signaling module 320 may pass through messages, or it may generate new messages. In either case, outgoing signaling module 330 performs all necessary transformations to messages output from intermediate signaling module 320 to enable the outgoing trunk, downline switch or downline network to handle the message properly. For example, message 114, containing parameters 'ABC', has been transformed by FESS 200A into message 115. Message 115, containing parameters 'LMN' has been sent over trunk 118 to FESS 200B. FESS 200B has transformed message 115 into message 116, containing parameters 'XYZ', and sent it to network 104.

Figure 2B:
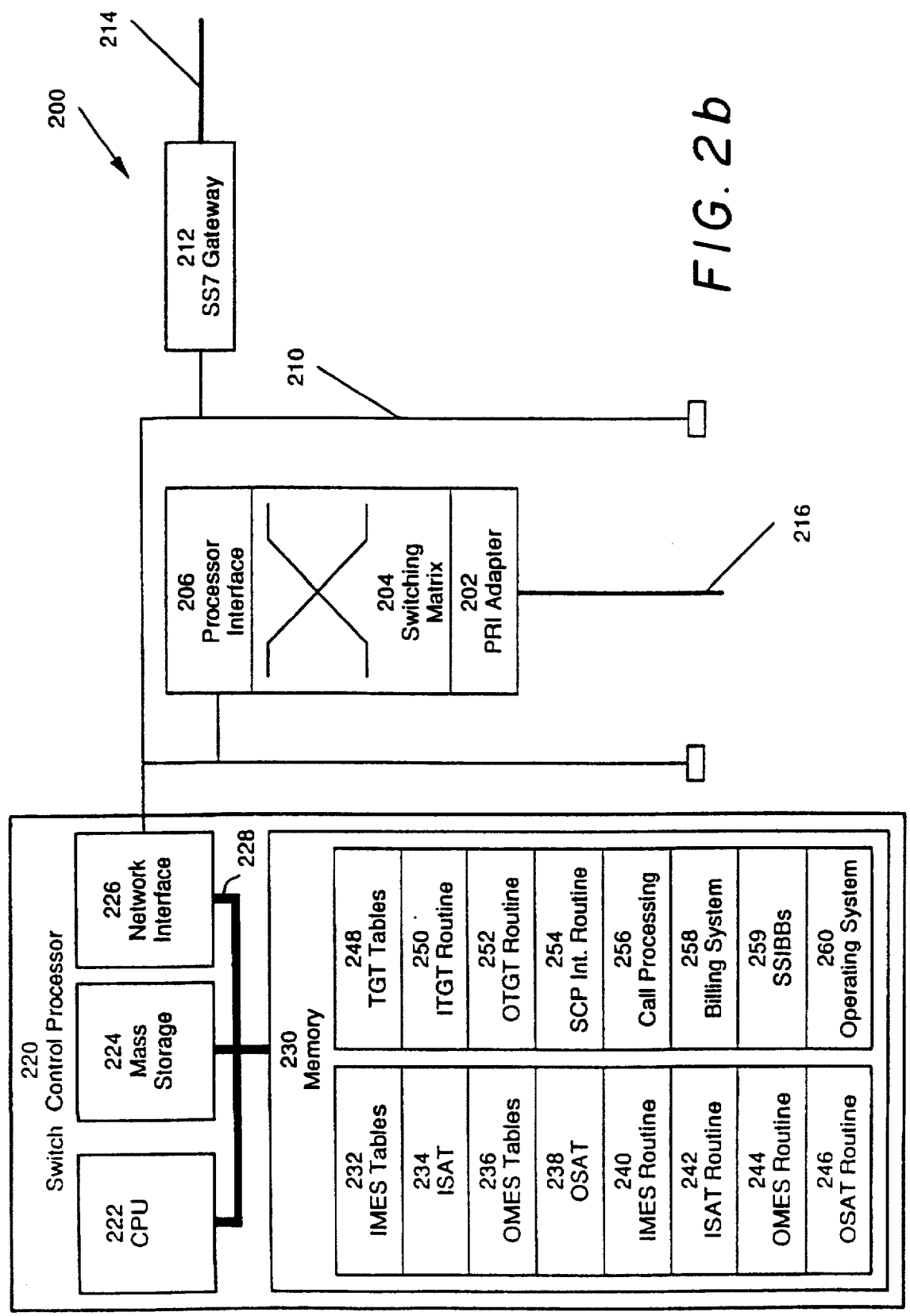

FIG. 2b is an exemplary block diagram of a flexible enhanced signaling subsystem (FESS) 200, shown in FIG. 2a. FESS 200 includes primary rate interface (PRI) adapter 202 which connects FESS 200 to PRI 216. The PRI is the ISDN equivalent of a T1 circuit and runs at 1.544 Mbps. Switching matrix 204 is connected to PRI adapter 202 and provides cross-connect switching between PRI circuits. Processor interface 206 connects switching matrix 204 to local area network 210 and allows Switch control processor 220, which also connects to network 210, to control and interrogate switching matrix 204. Also connected to network 210 is SS7 gateway 212 which connects switch 200 to SS7 network 214.

Although only one switch control processor 220 is shown in FIG. 2. it is well known in the art that a distributed architecture in which more than one computer system performs each function is entirely equivalent. Switch control processor 220 includes several elements. CPU 222 executes program instructions and processes data. Memory 230 stores program instructions executed by and data processed by CPU 222. Mass storage 224 stores data to be transferred to and from memory. Mass storage includes such devices as. for example, hard disk drives. floppy disk drives, removable disk drives. magneto-optic drives, optical drives and tape drives. Network interface 226. communicates with other devices and transfers data in and out of network processor 220 over local or wide area networks, such as, for example, ETHERNET or TOKEN RING. All these elements are interconnected by bus 228. which allows data to be intercommunicated between the elements.

Memory 230 is accessible by CPU 222 over bus 228 and includes Incoming Message (IMES) Control Table partition 232. Incoming Service Attribute Table (ISAT) partition 234. Outgoing Message (OMES) Control Table partition 236. Outgoing Service Attribute Table (OSAT) partition 238. IMES processing routine partition 240. ISAT processing routine partition 242. OMES processing routine partition 244. OSAT processing routine partition 246. trunk group (TGT) table partition 248. incoming message trunk group (ITGT) processing routine partition 250. outgoing message trunk group (OTGT) processing routine partition 252. signal control point (SCP) interface routine partition 254. call processing routine partition 256. billing system partition 258. signaling system integrated building block partition 259 and operating system partition 260.

Figure 3A:
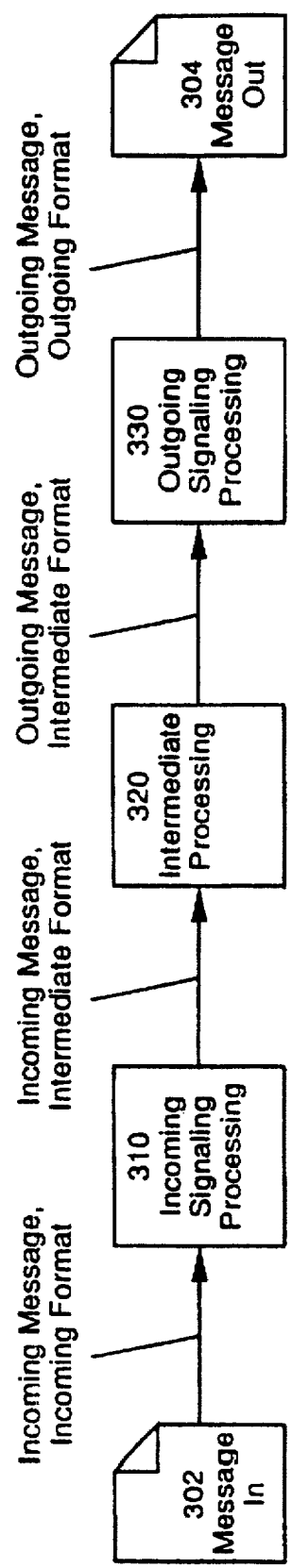
FIG. 3a is a data flow diagram of the processing of a message by FESS 200.

FIG. 3a is a data flow diagram of the processing of a message by FESS 200. Incoming message 302 is received by switch 200 in what is designated an incoming format. Incoming message 302 is first processed by incoming signaling module 310. After processing by incoming signaling module 310. incoming message 302 has been transformed to the format expected by intermediate signaling module 320. designated intermediate format in FIG. 3a.

The incoming message. in intermediate format, is input to intermediate signaling module 320. Intermediate signaling module 320 represents the normal processing performed on the message by switch 200. such as, for example, call processing, signal control point interface processing and billing system processing. During intermediate processing the switch may perform a variety of operations on the message, such as, for example, parsing the message, extracting the content of the data fields, performing calculations with and making decisions based on the values of the data fields and inserting new information into data fields of the message. In some cases. the incoming message may be passed through unaltered and output as the outgoing message. In some cases, the incoming message may be passed through in modified form and output as the outgoing message. In some cases, the incoming message may be blocked and no outgoing message output. In some cases, the incoming message may not be passed through. but an outgoing message may be generated and output. If an outgoing message is output, then during intermediate processing, a trunk group for the outgoing message is selected and indicated within the outgoing message. The outgoing message is output in what is designated intermediate format in FIG. 3a.

The outgoing message. in intermediate format, is input to outgoing signaling module 330. After processing by outgoing signaling module 330. the outgoing message has been transformed to the format expected by the trunk group which will receive the outgoing message. This is designated outgoing format in FIG. 3a. Outgoing message 304 is then transmitted.

Figure 3B:
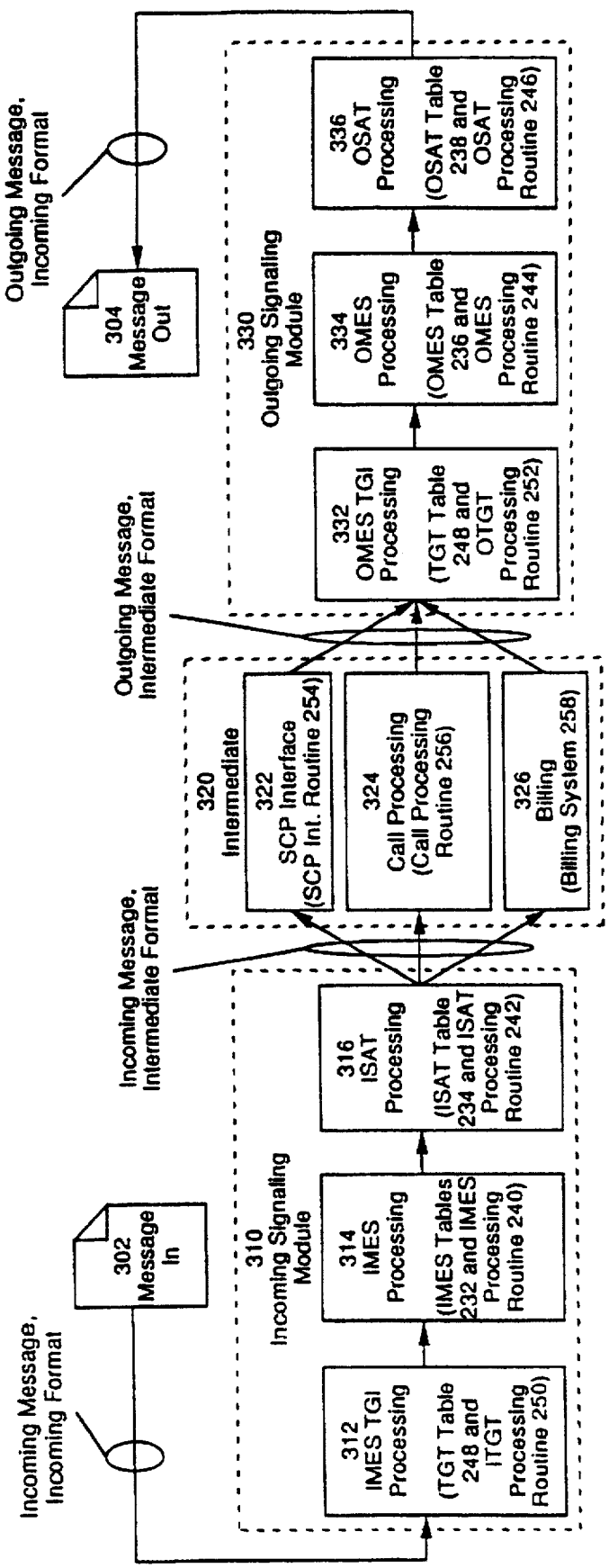
FIG. 3b is a data flow diagram showing the processing of FIG. 3a in greater detail.

FIG. 3b is a data flow diagram showing the processing of FIG. 3a in greater detail. Within incoming signaling module 310. incoming message 302. in incoming format. is first processed by incoming message trunk group index (IMES TGI) signaling module 312. Module 312 processing is performed by ITGT processing routine 250 using TGT table 248. The message is then processed by IMES signaling module 314. Module 314 processing is performed by IMES processing routine 240 using IMES tables 232. The message is then processed by ISAT signaling module 316. Module 316 processing is performed by ISAT processing routine 242 using ISAT 234..

After processing by incoming signaling module 310. incoming message 302. in incoming format. has been transformed to an incoming message in intermediate format. the format expected by intermediate signaling module 320. Depending upon the message type. the message is processed by one or more intermediate processing sub-modules 322. 324 and 326. Normal signaling messages are processed by call signaling module 324. performed by call processing routine 256. Call signaling module 324 is the normal call processing performed by the switch. The message has been reformatted to the format expected by the module. so call processing is performed normally. This eliminates the need to modify the core call processing routines in order to handle various message formats. Intermediate signaling module 320 processes the incoming message and generates an outgoing message, in intermediate format.

During intermediate processing by module 320. a trunk group for the outgoing message is selected and an indicator is included in the outgoing message. The outgoing message is then processed by outgoing signaling module 330. Within module 330, the outgoing message, in intermediate format. is first processed by outgoing message trunk group block (OMES TGI) signaling module 332. Module 332 processing is performed by OTGT processing routine 252 using TGT table 248. The message is then processed by OMES signaling module 334. Module 334 processing is performed by OMES processing routine 244 using OMES table 236. The message is then processed by OSAT signaling module 336. Module 336 processing is performed by OSAT processing routine 246 using OSAT 238. After processing by outgoing signaling module 330. the outgoing message. in intermediate format. bas been transformed to outgoing message 304. in outgoing format. the format expected by the network which will receive the message.

Figure 3C:
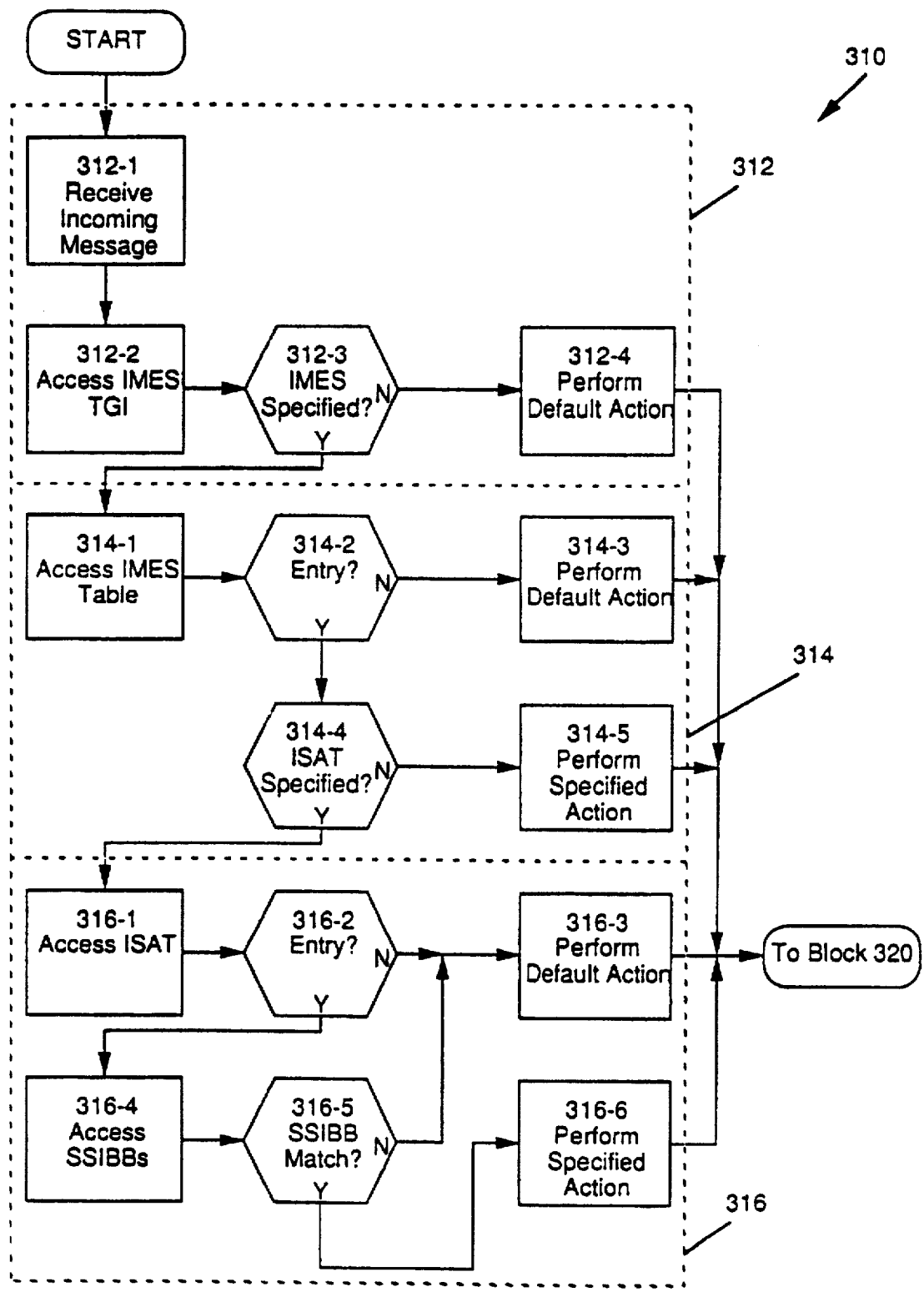

FIG. 3c is a flow diagram of the processing performed by incoming signaling module 310 of FIG. 3a. The process begins with step 312-1 of IMES TGI block 312. in which an incoming message is received. In step 312-2. the IMES TGI of the trunk group data entry corresponding to the trunk group of the incoming message is accessed. In step 312-3. it is determined whether an IMES table is specified in the accessed trunk group data entry. If no IMES table is specified. the process goes to step 312-4. in which the default action. typically pass through without alteration. is performed. If an IMES table is specified. the process goes to step 314-1 of IMES signaling module 314

In step 314-1. the IMES table is accessed to select the entry corresponding to the type of the received message. In step 314-2. it is determined whether there is such an entry in the IMES table. If there is no such entry, the process goes to step 314-3, in which the default action, typically pass through unaltered, is performed. If there is an entry, the process goes to step 314-4, in which it is determined whether an incoming service attribute table (ISAT) or an action is specified in the selected IMES table entry. If no ISAT is specified, the process goes to step 314-3, in which the action specified in the selected IMES table entry, typically pass or block, is performed. If an ISAT is specified, the process goes to step 316-1 of ISAT signaling module 316.

In step 316-1, the ISAT table is accessed to locate all entries corresponding to each parameter included in the received message. In step 316-2, it is determined for each parameter in the received message whether there is at least one entry corresponding to the parameter. For each parameter in the received message for which there is no entry, the process goes to step 316-3, in which the default action, typically pass through unaltered, is performed. For each entry included in the ISAT which corresponds to a parameter in the received message, the process goes to step 316-4, in which the signaling switch integrated building block (SSIBB) for each corresponding entry is accessed. In step 316-5, it is determined, for each corresponding entry, whether the SSIBB matches the parameter in the received message. For each corresponding entry in which the parameter in the received message does not match the SSIBB, the process goes to step 316-3, in which the default processing is performed. For each corresponding entry in which the parameter in the received message matches the SSIBB, the process goes to step 316-6, in which the action specified in the corresponding entry is performed.

Figure 3D:
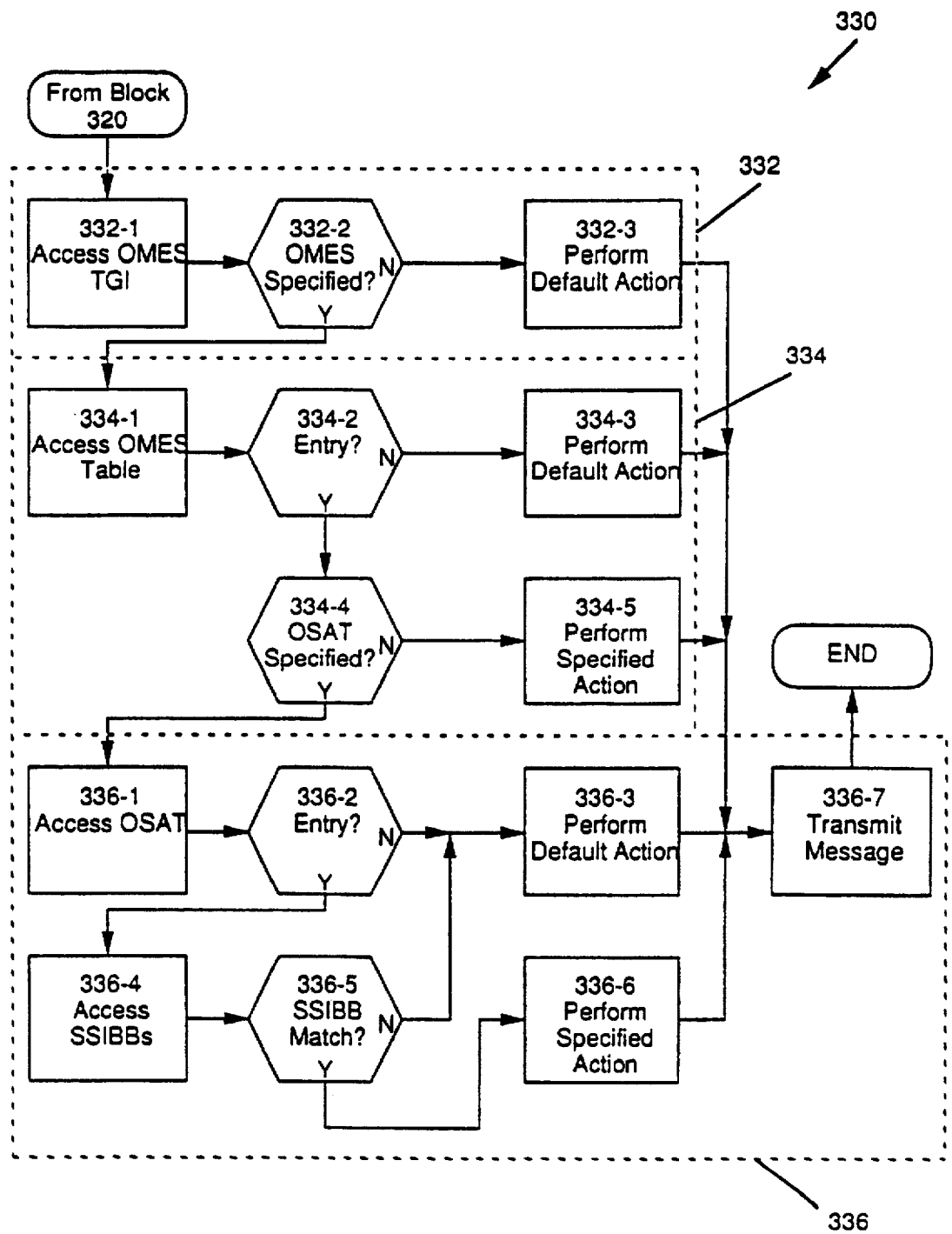

FIG. 3d is a flow diagram of the processing performed by outgoing signaling module 330 of FIG. 3a. The process begins with step 332-1, in which the OMES TGI of the trunk group data entry corresponding to the trunk group of the outgoing message is accessed. In step 332-2, it is determined whether an OMES table is specified in the accessed trunk group data entry. If no OMES table is specified, the process goes to step 332-3, in which the default action, typically pass through without alteration, is performed. If an OMES table is specified, the process goes to step 334-1 of OMES signaling module 334 In step 334-1, the OMES table is accessed to select the entry corresponding to the type of the outgoing message. In step 334-2, it is determined whether there is such an entry in the OMES table. If there is no such entry, the process goes to step 334-3, in which the default action, typically pass through unaltered, is performed. If there is an entry, the process goes to step 334-4, in which it is determined whether an OSAT or an action is specified in the selected OMES table entry. If no OSAT is specified, the process goes to step 334-5, in which the action specified in the selected OMES table entry, typically pass or block, is performed. If a SAT is specified, the process goes to step 336-1 of OSAT signaling module 336.

In step 336-1, the OSAT is accessed to locate all entries corresponding to each parameter included in the outgoing message. In step 336-2, it is determined for each parameter in the outgoing message whether there is at least one entry in the OSAT corresponding to the parameter. For each parameter in the outgoing message for which there is no entry, the process goes to step 336-3, in which the default location, typically pass through unaltered, is performed. For each entry included in the OSAT which corresponds to a parameter in the outgoing message, the process goes in step 336-4, in which the SSIBB for each corresponding entry is accessed. In step 336-5, it is determined, for each corresponding entry, whether the SSIBB matches the parameter in the outgoing message. For each corresponding entry in which the parameter in the outgoing message does not match the SSIBB, the process goes to step 336-3, in which the default processing is performed. For each corresponding entry in which the parameter in the outgoing message matches the SSIBB, the process goes to step 336-6, in which the action specified in the corresponding entry is performed.

Figure 4A:
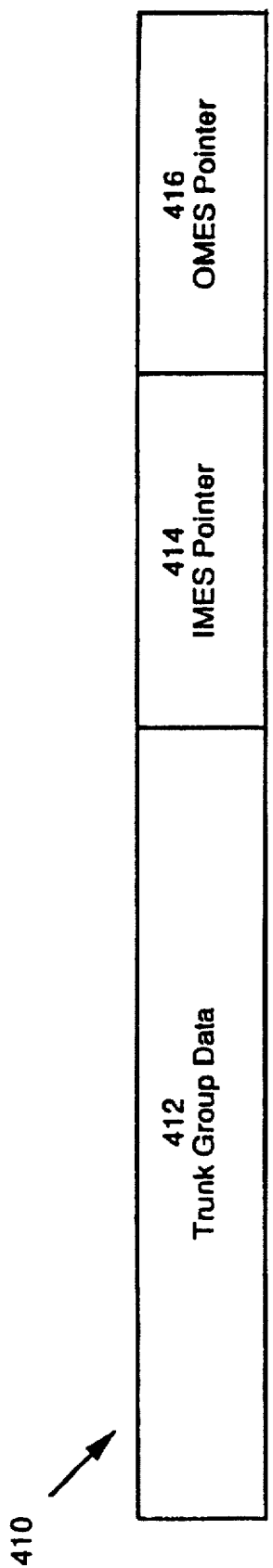
FIG. 4a is an exemplary format of a trunk group data entry 410.

FIG. 4a is an exemplary format of a trunk group data entry 410. There is one trunk group data entry 410 for each trunk group provisioned in switch 200. These entries are contained in TGT tables 248, shown in FIG. 2. Included are existing trunk group data 412, which is currently in use. Also included, in accordance with the present invention, are IMES pointer 414 and OMES pointer 416. IMES pointer 414 specifies a particular IMES table, contained in IMES tables partition 232, which is to be used by IMES processing routine 240 during processing of messages associated with that particular trunk group. IMES pointer 414 may also contain an indicator that no IMES table processing is to be done for that particular trunk group. In one embodiment, IMES pointer 414 can specify one of thirty-two IMES tables for each trunk group. Trunk groups for which there is no trunk group data entry receive default processing. In one embodiment, default processing comprises passing each message through unaltered.

OMES pointer 416 specifies a particular OMES table, contained in OMES tables partition 236, which is to be used by OMES processing routine 244 during processing of messages associated with that particular trunk group. OMES pointer 416 may also contain an indicator that no OMES table processing is to be done for that particular trunk group. In one embodiment, OMES pointer 416 can specify one of thirty-two IMES tables for each trunk group. Trunk groups for which there is no trunk: group data entry receive default processing. In one embodiment, default processing comprises passing each message through unaltered.

Figure 4B:
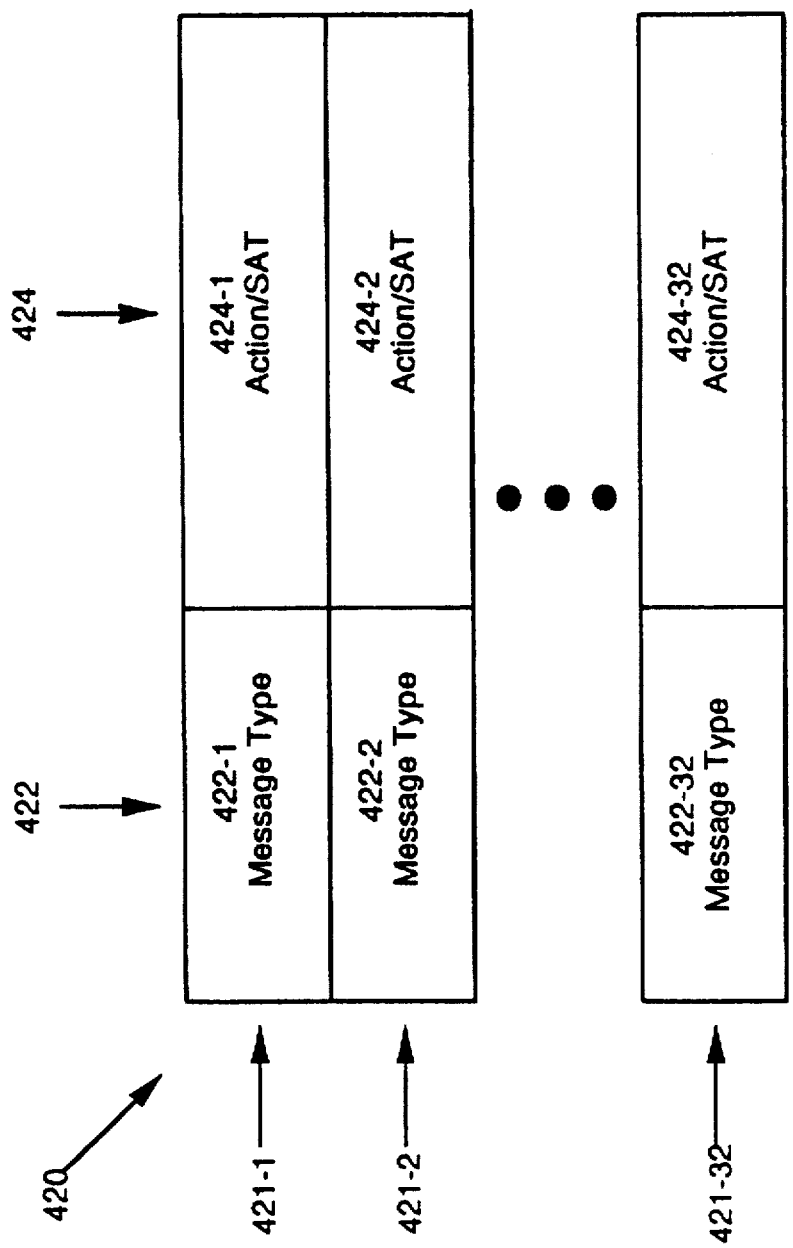
FIG. 4b is an exemplary format of an IMES or OMES table 420.

FIG. 4b is an exemplary format of an IMES or OMES table 420. IMES or OMES tables typically have the same format, but contain different data. Each entry in table 420 contains a message type indicator 422 and an action indicator 424. Message type indicator 422 specifies the type of message to be processed. The message types specified varies depending upon the trunk group with which the particular IMES or OMES table is associated. Action indicator 424 specifies the action which is to be taken upon receipt of a message of the type specified in the associated message type indicator. Typically, there are three possible actions. Messages may be blocked, passed through unaltered, or processed by a service attribute table specified in the action indicator. In addition, message types for which there is no entry in an IMES or OMES table receive default processing. Default processing typically comprises passing each message through unaltered. In one embodiment, each IMES or OMES table contains 32 entries 421-1 to 421-32, each entry including a message type indicator, 422-1 to 422-32, respectively, and an action indicator, 424-1 to 424-32, respectively.

Exemplary data which may be contained in an IMES or OMES table 420 is shown in Table 1.

TABLE 1

| Entry Number (01–32) | Message Type Indicator 422 (Hex Value) | Message Description | Action Indicator 424 (Pass, Block or SAT#) |
|---|---|---|---|
| 01 | 28H | Pass along | Block |
| 02 | 2CH | Call Progress | Block |
| 03 | 04H | Information | Block |
| 04 | 06H | Address Complete | SAT #3 |
| 05 | 01H | Initial Address | SAT #8 |
| ⋮ | | | |
| 32 | | | |

Figure 4C:
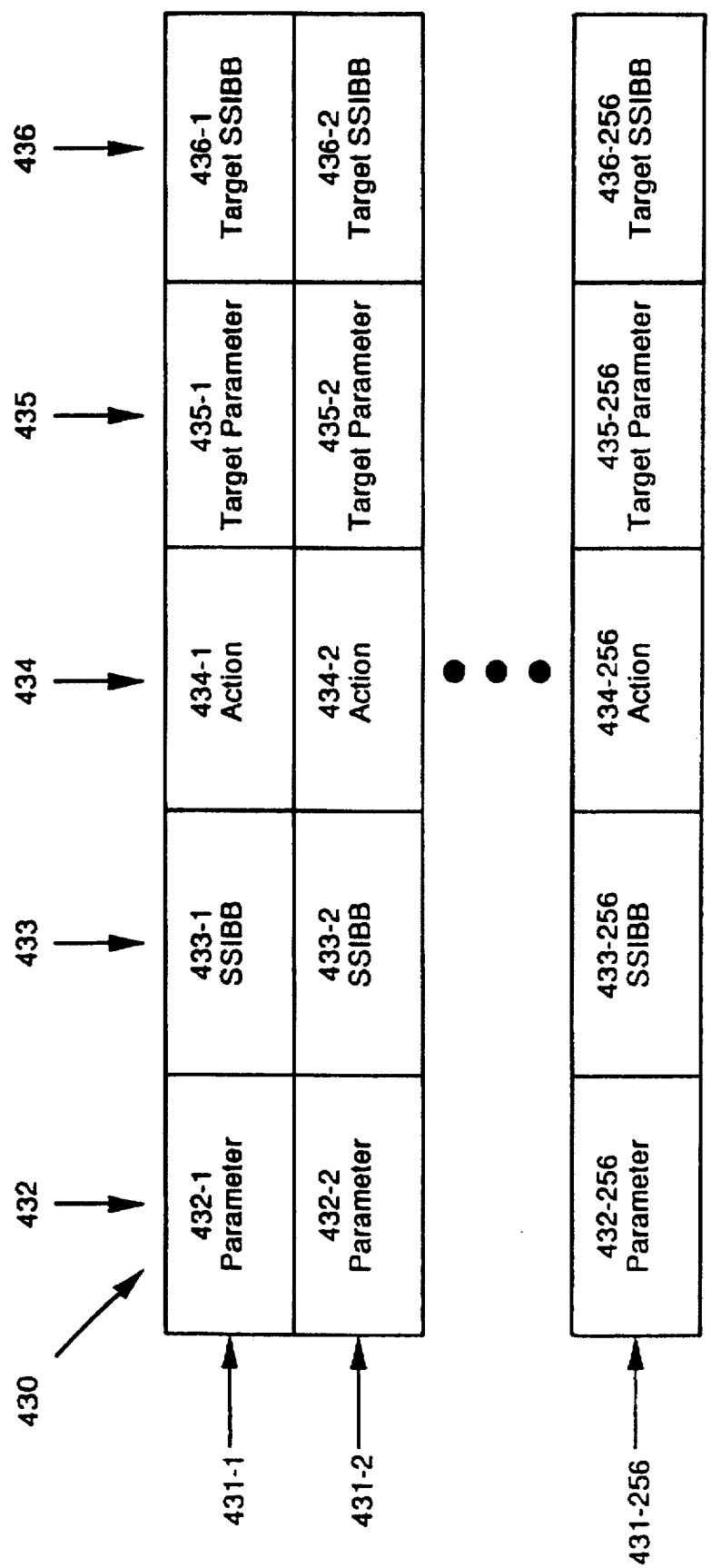
FIG. 4c is an exemplary format of a service attribute table (SAT) 430.

FIG. 4c is an exemplary format of a service attribute table (SAT) 430. SATs typically have the same format whether they are used to process incoming or outgoing messages, but may contain different data. Each entry 431 in SAT 430 contains a parameter indicator 432, a signaling system integrated building block (SSIBB) indicator 433, an action indicator 434, a target parameter 435 and a target SSIBB indicator 436. Parameter indicator 432 indicates a specific input parameter contained in the message being processed. These are considered input parameters because they are input to the processing specified in SAT 430. Each input parameter included in the message is compared with all the input parameters specified. Those input parameters which are not specified receive default processing, which is typically set to pass through the input parameter unaltered. Default processing may also be set to block the input parameter. Each input parameter which is specified receives further processing.

Each input parameter specified is compared against the SSIBB indicated by SSIBB indicator 433. Each SSIBB is a template specifying detailed format and/or value information about the input parameter. If the value and format of the input parameter match the those specified in the indicated SSIBB, the processing indicated by the remaining fields of the SAT entry is performed. SSIBB indicator 433 may also be set to indicate that no template matching is to be done and all values and formats of the input parameter are to receive the same processing. Action indicator 434 specifies the processing action which is to be performed on the input parameter. Target parameter 435 specifies the output parameter into which the input parameter is to be transformed. Although often an input parameter and an output parameter are the same, SAT processing allows the input and output parameters to be different if so specified. Target SSIBB indicator 436 is an indicator of the SSIBB to be used to generate the output parameter.

It is seen that SSIBBs may have two functions. SSIBBs specified by SSIBB indicator 433 are used as templates with which the actual values and formats of parameters are compared. SSIBBs specified by target SSIBB indicator 436 are used as templates to control values and formats of parameters being generated. The formats of SSIBBs may vary depending upon the function for which it is used, as is described below.

In one embodiment, each SAT contains up to 256 entries 431-1 to 431-256, each entry including a parameter indicator 432-1 to 432-256, a SSIBB indicator 433-1 to 433-256, an action indicator 434-1 to 434-256, a target parameter 435-1 to 435-256 and a target SSIBB indicator 436-1 to 436-256.

Exemplary data which may be contained in an ISAT or OSAT table 430 is shown in Table 2.

TABLE 2

| | Pass/Block Logic = PASS Parameter 432 | SSIBB 433 | Action 434 | Target Parameter 435 | Target SSIBB 436 |
|---|---|---|---|---|---|
| 01 | Generic Address | SSIBB # | Map | Called Party # | SSIBB # |
| 02 | ATP | ..... | Block | ..... | ..... |
| 03 | OLI | SSIBB # | Default | ..... | ..... |
| 04 | "FC" | ..... | Envelop | NTP | SSIBB # |
| 05 | Charge # | SSIBB # | Copy | CPN | SSIBB # |
| 06 | Backward Call Special | ..... | Block | ..... | ..... |
| ⋮ | | | | | |
| 256 | | | | | |

Figure 4D:
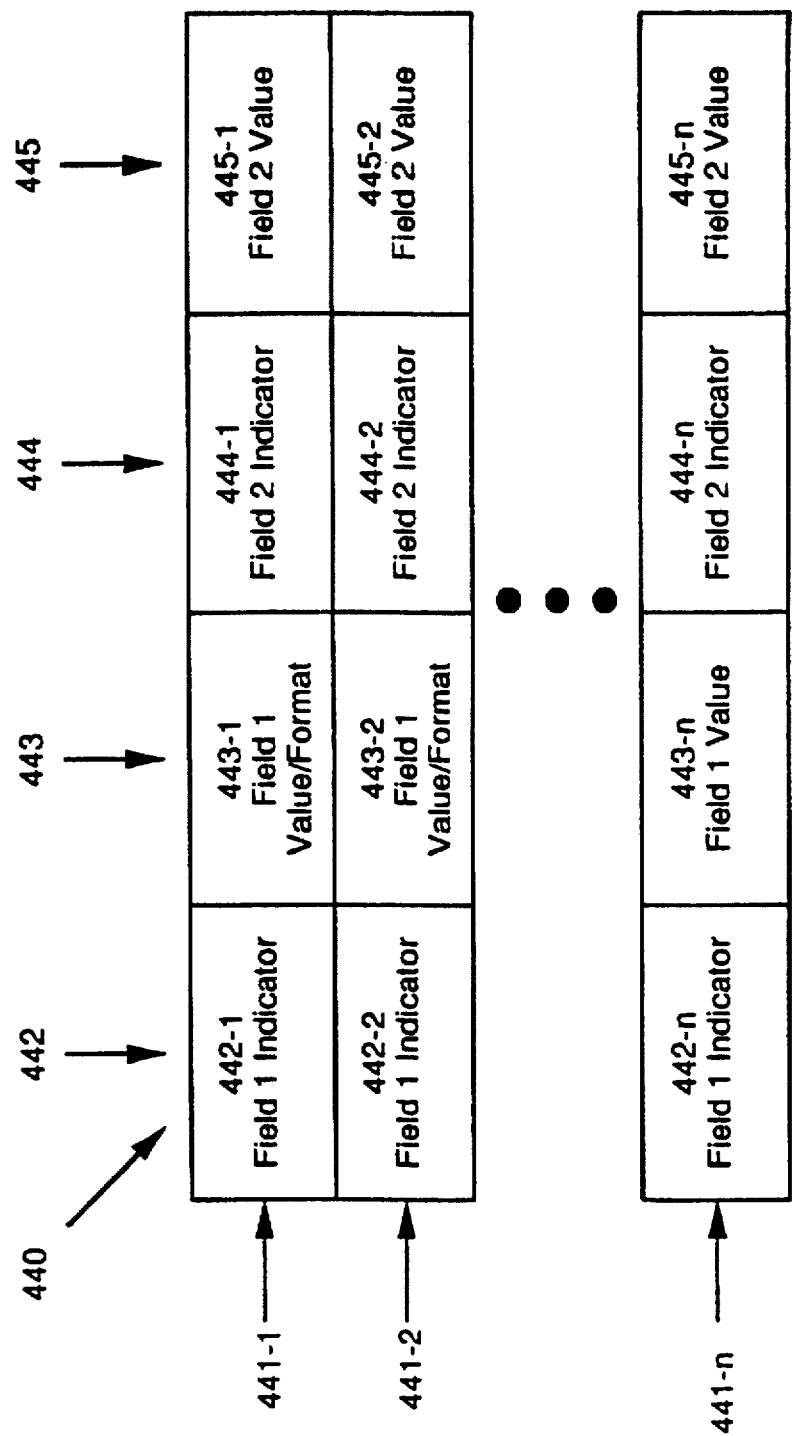
FIG. 4d is an exemplary format of a signaling switch integrated building block (SSIBB) data block 440.

FIG. 4d is an exemplary format of a data block 440 containing a plurality of SSIBBs 441-1 to 441-n. In the embodiment shown, each SSIBB contains two field indicators, field 1 indicator 442 and field 2 indicator 444, and two field value/format indicators, field 1 value/format indicator 443 and field 2 value/format indicator 445. When a SSIBB is used as a template with which the actual value and format of a parameter are compared, each field indicator 442 and 444 specifies a particular field of the parameter which is to be compared. Each field value/format indicator, if present, specifies a value or value range, a format, or both, of the field to be compared. The actual value and/or format of the field specified by each field indicator 442 or 444 is compared with the value or value range and/or format specified by the corresponding field value/format indicator 443 or 445. If all field value/format comparisons yield a match, the processing action specified by the action indicator 434 of the service attribute table entry in which the current SSIBB is specified is performed. If any field value comparisons do not match, no processing action is taken.

When a SSIBB is used as a template to control the value and format of a parameter being generated, each field indicator 442 and 444 specifies a particular field of the target parameter which is to be generated. Each field value/format indicator, if present, specifies a value or value range, a format, or both, which controls the field to be generated. The field generated has a value equal to the specified value, or within the specified value range and/or has the format specified.

Although the embodiment shown contains two field indicators and their corresponding value/format indicators, other embodiments may provide for only one field indicator and field value/format indicator or for more than two field indicators and field value/format indicators.

Exemplary data which may be contained in a SSIBB block 440 is shown in Table 3.

TABLE 3

| SSI BB # | Field 1 Indicator | Field 1 Value /Format | Field 2 Indicator | Field 2 Value /Format |
|---|---|---|---|---|
| 1 | Type of Address | 00H | Nature of Address | 03H |
| 2 | Type of Address | 02H | Nature of Address | 01H |
| 3 | Type of Address | 02H | Nature of Address | 03H |
| 4 | Type of Address | 02H | Nature of Address | 04H |
| 5 | Type of Address | 03H | Nature of Address | 01H |
| 6 | Type of Address | 03H | Nature of Address | 03H |
| 7 | Type of Address | 03H | Nature of Address | 04H |
| 8 | Type of Number | 04H - ANI Index | Encoding | Binary |
| 9 | Type of Number | 10H - OSID+OTG | Encoding | BCD |
| 10 | Type of Number | 15H - OOY Code | Encoding | BCD |
| 11 | Type of Number | 09H - TSID+TTG | Encoding | BCD |
| 12 | Nature of Address | 01H | | |
| 13 | Nature of Address | 03H | | |
| 14 | Nature of Address | 01H | Presentation Ind. | 00H Pres. Allowed |
| 15 | Nature of Address | 01H | Presentation Ind. | 01H Pres. Res. |
| 16 | Nature of Address | 03H | Presentation Ind. | 00H Pres. Allowed |
| 17 | Nature of Address | 03H | Presentation Ind. | 01H Pres. Res. |
| 18 | Nature of Address | 04H | Presentation Ind. | 00H Pres. Allowed |
| 19 | Nature of Address | 04H | Presentation Ind. | 00H Pres. Res. |
| 20 | Nature of Address | CPN Not Present | Presentation Ind. | CPN Not Present |
| 21 | Nature of Address | 01H | Number Plan | 1H |
| 22 | Nature of Address | 01H | Number Plan | 5H |
| 23 | Nature of Address | 03H | Number Plan | 1H |
| 24 | Nature of Address | 03H | Number Plan | 5H |
| 25 | Nature of Address | 04H | Number Plan | 1H |
| 26 | Nature of Address | 04H | Number Plan | 5H |
| 27 | Nature of Address | | Number Plan | |
| 28 | Nature of Address | 01H | Presentation Ind. | 00H Pres. Allowed |
| 29 | Nature of Address | 01H | Presentation Ind. | 01H Pres. Res. |
| 30 | Nature of Address | 03H | Presentation Ind. | 00H Pres. Allowed |
| 31 | Nature of Address | 03H | Presentation Ind. | 01H Pres. Res. |
| 32 | Nature of Address | 04H | Presentation Ind. | 00H Pres. Allowed |
| 33 | Nature of Address | 04H | Presentation Ind. | 01H Pres. Res. |
| 34 | Nature of Address | 01H | Presentation Ind. | 00H Pres. Allowed |
| 35 | Nature of Address | 01H | Presentation Ind. | 01H Pres. Res. |
| 36 | Nature of Address | 03H | Presentation Ind. | 00H Pres. Allowed |
| 37 | Nature of Address | 03H | Presentation Ind. | 01H Pres. Res. |
| 38 | Nature of Address | 04H | Presentation Ind. | 00H Pres. Allowed |
| 39 | Nature of Address | 04H | Presentation Ind. | 01H Pres. Res. |

A typical message is the initial address message (IAM). An IAM is identified by the of its Message Type code point. The parameters of the IAM are shown in Table 4.

TABLE 4

| Parameter | Type | Length |
|---|---|---|
| Nature of Connection Indicators | F | 1 |
| Forward Call Indicators | F | 2 |
| Calling Party's Category | F | 1 |
| User Service Information | V | 3-n |
| Called Party Number | V | 2-11 |
| Access Transport | O | 3-n |
| Business Group | O | 9-n |
| Call Reference | O | 8 |
| Calling Party Number | O | 5-12 |
| Carrier Identification Code | O | 5 |
| Carrier Selection Information | O | 3 |
| Charge Number | O | 3-14 |
| Circuit Assignment Map | O | 6 |
| Generic Address | O | 6-13 |
| Generic Digits | O | 4-n |
| Forward Call Special Information | O | 3 |
| Multiple Business Group | O | 9 |
| Network Specific Facility | O | 3-n |
| Operator Information | O | 9-n |
| Software Indicator | O | 3 |
| Supplementary Line Information | O | 3-n |

In Table 4, F represents a fixed length required parameter, V represents a variable length required parameter, 0 represents an optional parameter and the Length shown is in bytes.

Among the parameters of the IAM are the generic address, an optional parameter of 6-13 bytes in length. The field format of the generic address parameter is shown in Table 5:

TABLE 5

| Byte | 7 | 6 | 5 | 4 | 3 | 2 | 1 | 0 |
|---|---|---|---|---|---|---|---|---|
| 1 | | | | Type of address | | | | |
| 2 | Parity | | | Nature of Address Indicator | | | | |
| 3 | Spare | | Numbering Plan | | | PRES | | Reserved |
| 4 | | D2 | | | | D1 | | |
| 5 | | D4 | | | | D3 | | |
| : | : | | | | : | | | |
| m-1 | | D(m-2) | | | | D(M-3) | | |
| m | | D(m) or filler if odd number of digits | | | | D(m-1) | | |

The Generic Address parameter includes several data elements. The Type of Address field specifies the type of number conveyed in the parameter. The options are:

| | |
|---|---|
| 00000000 | Dialed Number (DNIS) |
| 10111101 | Far End Remote Access 800 Number |
| 10111110 | Far End DNIS |
| 10111111 | Far End ANI |

All other values are spare or reserved.

The Nature of Address Indicator field defines the format of the information contained in the digits field as follows:

| | |
|---|---|
| 00000001 | Subscriber Number (7D) |
| 00000011 | National Number (10D) |
| 00000100 | International Number (CC + NN) |

All other values are spare or reserved.

The Parity bit indicates whether the number of digits is even or odd. Zero indicates the number of digits is even. One indicates the number of digits is odd. The Reserved field is currently spare, but may be used in the future. Currently, it is filled with zero.

The Presentation (PRES) Indicator field specifies whether the originating address may be disclosed or must be kept confidential, as follows:

| | |
|---|---|
| 00 | Address presentation allowed (default) |
| 01 | Address presentation restricted |
| 10 | Address unavailable due to internetworking |
| 11 | Spare/Reserved |

The Numbering Plan Indicator field defines the type of numbering plan that must be activated for the present application. The Spare bit is an unused bit which is set to zero. The digit subfields D1–Dm represent the digits of the number being charged for the call. Each digit occupies four bits, encoded in BCD format as follows:

| | |
|---|---|
| 0000 | Digit 0 |
| 0001 | Digit 1 |
| 0010 | Digit 2 |
| 0011 | Digit 3 |
| 0100 | Digit 4 |
| 0101 | Digit 5 |
| 0110 | Digit 6 |
| 0111 | Digit 7 |
| 1000 | Digit 8 |
| 1001 | Digit 9 |
| 1010–1111 | Spare/Reserved |

Figure 5:
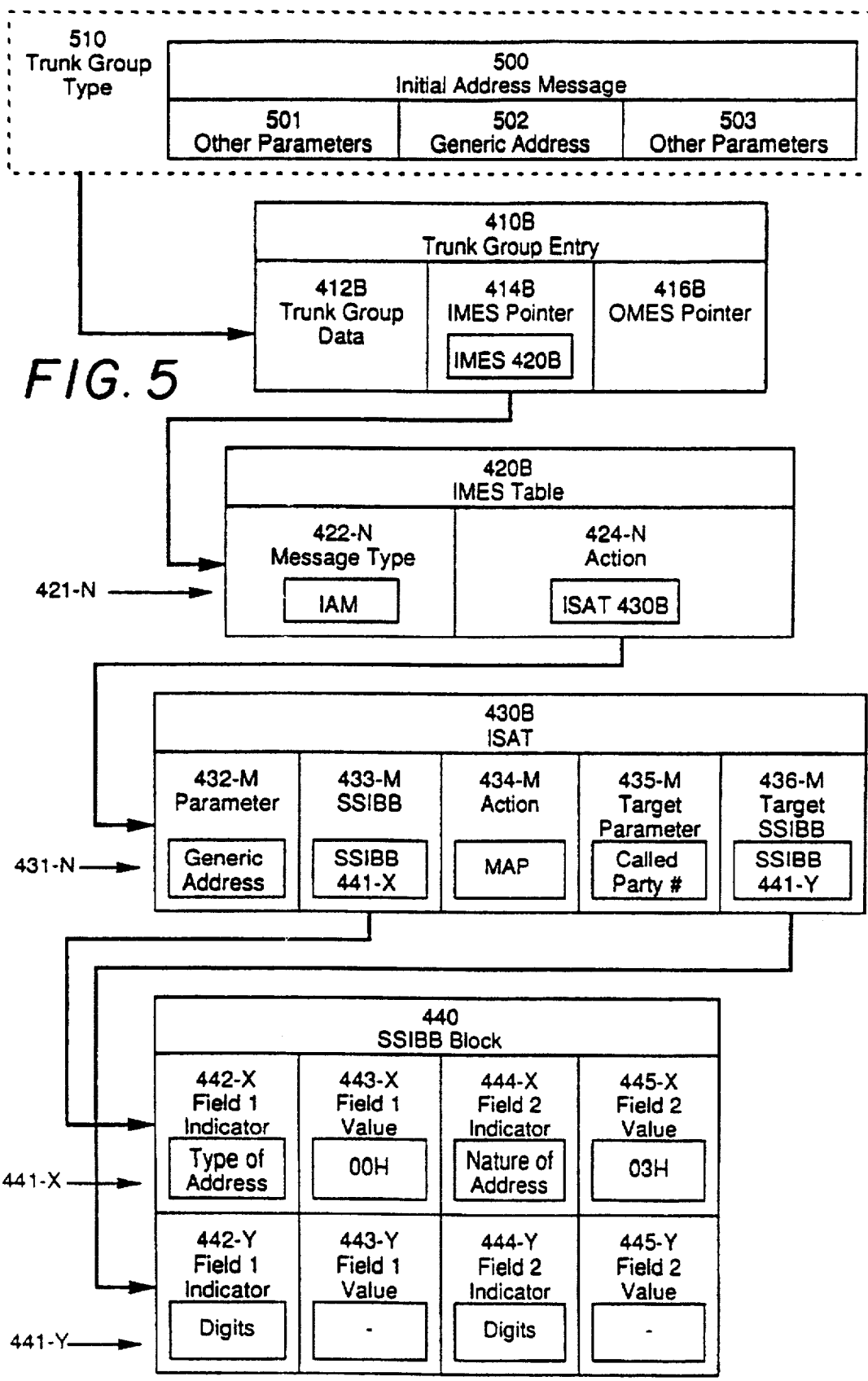

As an example, the processing of a message is shown in FIG. 5. It is best understood when viewed in conjunction with FIG. 3b. For example, an incoming initial address message (IAM) 500 is received by IMES TGI signaling module 312 of FIG. 3b. IAM 500 contains, for example, generic address parameter 502 and other parameters 501 and 503. IAM also has associated with it a trunk group 510 which is used to select the trunk group entry, for example, trunk group entry 410B, corresponding to that trunk group. Trunk group entry 410B contains trunk group data 412B, IMES pointer 414B and OMES pointer 416B. Since, in this example, IAM 500 is an incoming message, IMES pointer 414B is accessed. IMES pointer 414B may indicate an IMES table to be used for further processing by IMES signaling module 314 of FIG. 3b.

IMES signaling module 314 of FIG. 3b accesses the IMES table indicated by IMES pointer 414B. In this example, IMES pointer 414B indicates IMES table 420B, so IMES table 420B is accessed. IMES table 420B contains multiple entries. Each entry contains a message type indicator and an action indicator. IMES signaling module 314 searches the message type indicators of the accessed IMES table for entries having the same message type as the incoming message. If such an entry is found, the action indicated in the entry is performed. If the indicated action is to access an ISAT, ISAT signaling module 316 of FIG. 3b does so. In this example, entry 421-N contains message type indicator 422-N which indicates an IAM, so the action indicated by action indicator 424-N is performed. Here, the action indicated is to access SAT 430B, so ISAT signaling module 316 of FIG. 3b accesses ISAT 430B.

ISAT 430B contains multiple entries. Each entry contains an indicator of a parameter to be processed. In this example, entry 431-M contains parameter indicator 432-M which indicates the generic address parameter. Therefore, the processing indicated by the remainder of the entry is performed on the generic address parameter.

SSIBB indicator 433-M indicates that SSIBB 441-X is to be used as a template for processing the generic address parameter. In this example, the generic address parameter is examined to determine whether the type of address field indicates that the address is a dialed number (DNIS), indicated by value 00H and whether the nature of address field indicates that the address is a ten digit national number, indicated by value 03H. This processing proceeds as follows: The field indicated by field 1 indicator 442-X is compared with the value contained by field 1 value indicator 443-X. Here, field 1 indicator 442-X specifies the type of address field and field 1 value indicator 443-X specifies 00H. The field indicated by field 2 indicator 444-X is compared with the value contained by field 2 value indicator 445-X. Here, field 2 indicator 444-X specifies the nature of address field and field 2 value indicator specifies 03H.

If both comparisons match, the action specified in action indicator 434-M of ISAT 430B is performed on the specified parameter. Here, action indicator 434-M indicates that a mapping operation is to be performed on the specified parameter, the generic address. Target parameter indicator 435-M specifies the parameter into which the parameter indicated by parameter indicator 432-M is to be mapped. In this example, the generic address is to be mapped into the called party parameter. Target SSIBB indicator 436-M indicates that SSIBB 441-Y is to be used as a template for the mapping process. This processing proceeds as follows: The field of the input parameter indicated by field 1 indicator 442-Y is accessed. Field 1 value indicator 443-Y indicates the value or value range which is to be processed. Here, the digits field of the generic address parameter is accessed. No value or value range is specified, so any value is processed. The action specified by action indicator 434-M is performed on the accessed field. Here, the action specified is MAP. The field of the target parameter to which the accessed field is to be copied is specified by field 2 indicator 444-Y. Field 2 value indicator 445-Y specifies any target value range into which the accessed field is to be mapped. Here, no value range is specified. Therefore, SSIBB 441-Y maps the digits field of the generic address parameter to the digits field of the called party number parameter with no value modification.

Although a specific embodiment of the present invention has been disclosed, it will be seen by those of skill in the art that other equivalent embodiments are possible.

What is claimed is:

1. A telecommunications switch with enhanced signaling, coupled to a telecommunications signaling network communicating a signaling message with the switch, the signaling message having associated with it a trunk group and including a message type indicator, the switch comprising:

a processor, coupled to the telecommunications network, for reformatting a signaling message communicating with the network; and a memory, coupled to and accessible by the processor, including a trunk group index for controlling the reformatting performed by the processor based on the trunk group associated with the message; and a message control table for controlling the reformatting of the signaling message performed by the processor based on the message type of the message.

2. The switch of claim 1, wherein the message control table comprises:

a plurality of entries, each entry having a message type processing indicator to be compared with the message type of the message by the processor; and a processing action indicator for indicating an action to be performed on the message by the processor when the message type indicator of the entry matches the message type of the message.

3. The switch of claim 2, wherein the signaling message further comprises at least one parameter and the memory further comprises:

a service attribute table for controlling the reformatting performed by the processor based on the parameter of the message.

4. The switch of claim 3, wherein the service attribute table comprises:

a plurality of entries, each entry having a parameter indicator for indicating the parameter of the message to be processed; and a processing action indicator for indicating an action to be performed on the indicated parameter by the processor.

5. The switch of claim 1, wherein the memory further comprises:

a plurality of message control tables for controlling the reformatting performed by the processor based on the message type of the message; and a plurality of trunk group indexes, each trunk group index being associated with a trunk group, each trunk group index including an incoming message control table indicator for indicating an incoming message control table to be used to control the reformatting of messages corresponding to the trunk group of each trunk group index.

6. The switch of claim 5, wherein each message control table comprises:

a plurality of entries, each entry having a message type processing indicator to be compared with the message type of the message by the processor; and a processing action indicator for indicating an action to be performed on the message by the processor when the message type indicator of the entry matches the message type of the received message.

7. The switch of claim 6, wherein the signaling message further comprises at least one parameter and the memory further comprises:

a plurality of service attribute tables for controlling the reformatting performed by the processor based on the parameter of the message.

8. The switch of claim 7, wherein each processing action indicator comprises:

a default processing action indicator for indicating a processing action to be performed on all messages of the indicated message type; or a service attribute table indicator for indicating a service attribute table to be used to control processing of all messages of the indicated message type.

9. A telecommunications switch with enhanced signaling, comprising:

a signaling message receiver for receiving a signaling message from a telecommunications signaling network;

a processor, coupled to the receiver for reformatting the received message; and a memory, coupled to and accessible by the processor, having a trunk group index for controlling the reformatting of the received message performed by the processor based on a trunk group associated with the received message; and an incoming message control table for controlling the reformatting of the received message performed by the processor based on the message type of the received message.

10. The switch of claim 9, wherein the incoming message control table comprises:

a plurality of entries, each entry having a message type processing indicator to be compared with the message type of the received message by the processor; and a processing action indicator for indicating an action to be performed on the received message by the processor when the message type indicator of the entry matches the message type of the received message.

11. The switch of claim 10, wherein the received message further comprises at least one parameter and the memory further comprises:

an incoming service attribute table for controlling the reformatting performed by the processor based on the parameter of the received message.

12. The switch of claim 11, wherein the incoming service attribute table comprises:

a plurality of entries, each entry having a parameter indicator for indicating the parameter of the received message to be processed; and a processing action indicator for indicating an action to be performed on the indicated parameter by the processor.

13. The switch of claim 12, further comprising:

a signaling message transmitter, coupled to the processor, for transmitting a signaling message formatted by the processor to the telecommunications signaling network; and wherein the memory further comprises an outgoing message control table for controlling the reformatting performed by the processor based on the message type of the message to be transmitted.

14. The switch of claim 13, wherein the outgoing message control table comprises:
 a plurality of entries, each entry having
  a message type processing indicator to be compared with the message type of the message to be transmitted by the processor; and
  a processing action indicator for indicating an action to be performed on the message to be transmitted by the processor when the message type indicator of the entry matches the message type of the message to be transmitted.

15. The switch of claim 14, wherein the message to be transmitted further comprises at least one parameter and the memory further comprises:
 an outgoing service attribute table for controlling the reformatting performed by the processor based on the parameter of the message to be transmitted.

16. The switch of claim 15, wherein the outgoing service attribute table comprises:
 a plurality of entries, each entry having
  a parameter indicator for indicating the parameter of the message to be transmitted to be processed; and
  a processing action indicator for indicating an action to be performed on the indicated parameter by the processor.

17. The switch of claim 9, further comprising:
 a signaling message transmitter, coupled to the processor, for transmitting a signaling message formatted by the processor to the telecommunications signaling network; and
 wherein the memory further comprises
  an outgoing message control table for controlling the reformatting performed by the processor based on the message type of the message to be transmitted.

18. The switch of claim 17, wherein the outgoing message control table comprises:
 a plurality of entries, each entry including
  a message type processing indicator to be compared with the message type of the message to be transmitted by the processor; and
  a processing action indicator for indicating an action to be performed on the message to be transmitted by the processor when the message type indicator of the entry matches the message type of the message to be transmitted.

19. The switch of claim 18, wherein the message to be transmitted further comprises at least one parameter and the memory further comprises:
 an outgoing service attribute table for controlling the reformatting performed by the processor based on the parameter of the message to be transmitted.

20. The switch of claim 19, wherein the outgoing service attribute table comprises:
 a plurality of entries, each entry having
  a parameter indicator for indicating the parameter of the message: to be transmitted to be processed; and
  a processing action indicator for indicating an action to be performed on the indicated parameter by the processor.

21. In a telecommunications switch coupled to a telecommunications signaling network, a method of processing signaling messages communicated with the network, the switch comprising a processor and a memory, the method comprising the steps of:

obtaining a signaling message to be processed;
 selecting a trunk group index in the memory based on a trunk group associated with the signaling message;
 selecting a message control table in the memory indicated by the selected trunk group index;
 selecting an entry of the selected message control table corresponding to the message type of the signaling message;
 selecting a service attribute table in the memory indicated by the selected entry of the selected message control table;
 selecting an entry of the selected service attribute table corresponding to a parameter of the signaling message; and
 performing the action specified by the selected entry of the selected service attribute table on the corresponding parameter of the signaling message.

22. In a telecommunications switch comprising a processor, a signaling message receiver, coupled to a telecommunications signaling network, and a memory, including a plurality of processing control tables including a plurality of service attribute tables, a plurality of incoming message control tables and at least one trunk group data entry, a method of processing signaling messages comprising the steps of:
 A) receiving an incoming message, the incoming message having associated with it a trunk group and including a message type and at least one parameter, the parameter having a format and a value;
 B) determining whether an incoming message control table is to be used, based on the trunk group associated with the incoming message;
 C) performing a default action, if no incoming message control table is to be used;
 D) selecting an incoming message control table based on the trunk group associated with the incoming message, if an incoming message control table is to be used;
 E) determining whether the selected incoming message control table contains an entry corresponding to the message type of the incoming message;
 F) performing a default action, if the incoming message control table does not contain an entry corresponding to the message type of the incoming message;
 G) determining whether an incoming service attribute table is to be used with the message type of the incoming message;
 H) performing an action specified in the incoming message control table entry corresponding to the message type of the incoming message, if no incoming service attribute table is to be used with the message type of the incoming message;
 I) selecting an incoming service attribute table specified in the incoming message control table entry corresponding to the message type of the incoming message, if an incoming service attribute table is to be used with the message type of the incoming message
 J) determining, for a parameter included in the incoming message, whether the incoming service attribute table contains an entry corresponding to the parameter;
 K) performing a default action, if the incoming service attribute table does not contain an entry corresponding to the parameter;
 L) selecting a signaling switch integrated building block specified in the entry in the incoming service attribute table corresponding to the parameter;

M) determining whether the selected signaling switch integrated building block matches the parameter;

N) performing a default action, if the selected signaling switch integrated building block does not match the parameter; and O) performing the action specified in the incoming service attribute table entry corresponding to the parameter.

23. The method of claim 22, wherein the telecommunications switch further comprises a signaling message transmitter, coupled to a telecommunications signaling network, and the method further comprises the steps of:

P) obtaining an outgoing message, the outgoing message having associated with it a trunk group and including a message type and at least one parameter, the parameter having a format and a value;

Q) determining whether an outgoing message control table is to be used, based on the trunk group associated with the outgoing message;

R) performing a default action, if no outgoing message control table is to be used;

S) selecting an outgoing message control table based on the trunk group associated with the outgoing message, if an outgoing message control table is to be used;

T) determining whether the selected outgoing message control table contains an entry corresponding to the message type of the outgoing message;

U) performing a default action, if the outgoing message control table does not contain an entry corresponding to the message type of the outgoing message;

V) determining whether an outgoing service attribute table is to be used with the message type of the outgoing message;

W) performing an action specified in the outgoing message control table entry corresponding to the message type of the outgoing message, if no outgoing service attribute table is to be used with the message type of the outgoing message;

X) selecting an outgoing service attribute table specified in the outgoing message control table entry corresponding to the message type of the outgoing message, if an outgoing service attribute table is to be used with the message type of the outgoing message Y) determining, for a parameter included in the outgoing message, whether the outgoing service attribute table contains an entry corresponding to the parameter;

Z) performing a default action, if the outgoing service attribute table does not contain an entry corresponding to the parameter;

AA) selecting a signaling switch integrated building block specified in the entry in the outgoing service attribute table corresponding to the parameter;

BB) determining whether the selected signaling switch integrated building block matches the parameter;

CC) performing a default action, if the selected signaling switch integrated building block does not match the parameter; and DD) performing the action specified in the outgoing service attribute table entry corresponding to the parameter.

* * * * *